United States Patent
Chen et al.

(10) Patent No.: US 7,012,971 B2
(45) Date of Patent: Mar. 14, 2006

(54) CHANNEL QUALITY ASSESSMENT METHOD AND SYSTEM FOR PERFORMING THE SAME

(75) Inventors: Hung-Kun Chen, Hsinchu (TW); Kwang-Cheng Chen, Palo Alto, CA (US)

(73) Assignee: Mediatek Inc., Hsinchu (TW)

( * ) Notice: Subject to any disclaimer, the term of this patent is extended or adjusted under 35 U.S.C. 154(b) by 750 days.

(21) Appl. No.: 09/929,165

(22) Filed: Aug. 14, 2001

(65) Prior Publication Data
US 2003/0026353 A1    Feb. 6, 2003

Related U.S. Application Data

(60) Provisional application No. 60/291,395, filed on May 14, 2001.

(51) Int. Cl.
*H03K 9/00* (2006.01)
(52) U.S. Cl. ............... 375/316; 375/224; 375/362; 375/240; 455/63.3; 455/435.3; 714/800
(58) Field of Classification Search ............ 375/316, 375/224; 455/435, 63, 63.3, 435.3; 714/800
See application file for complete search history.

(56) References Cited

U.S. PATENT DOCUMENTS

| | | | | |
|---|---|---|---|---|
| 5,095,531 A | * | 3/1992 | Ito | 455/435.3 |
| 5,671,253 A | * | 9/1997 | Stewart | 375/316 |
| 5,799,242 A | * | 8/1998 | Sano | 455/63.3 |
| 2003/0084400 A1 | * | 5/2003 | Kaku et al. | 714/800 |

* cited by examiner

*Primary Examiner*—Stephen Chin
*Assistant Examiner*—Eva Zheng
(74) *Attorney, Agent, or Firm*—Thomas, Kayden, Horstemeyer & Risle

(57) ABSTRACT

A channel quality assessment with short assessment time and good frequency resolution is disclosed. Some channels are grouped and their detecting results are collected as whale to determine the channel quality. The channel quality is determined by interference collision ratio, which is the ratio of the number of interference events to the sum of the number of interference events and interference-free events. Interfered channels are disabled form the group. The Channel quality of each of plurality of channels is determined from detection results of each of plurality of groups so as to have a short assessment time and meanwhile a good frequency resolution may be retained.

30 Claims, 2 Drawing Sheets

US 7,012,971 B2

CHANNEL QUALITY ASSESSMENT METHOD AND SYSTEM FOR PERFORMING THE SAME

Priority is claimed from U.S. provisional patent application Ser. No. 60/291,395, filed on May 14, 2001, entitled "Channel Quality Assessment", wherein is incorporated herein by reference in its entirety.

FIELD OF THE INVENTION

The present invention relates generally to frequency hopping spread spectrum communications, and especially to channel quality assessment responsive to random interferences in an FHSS communications system.

BACKGROUND OF THE INVENTION

In wireless communication systems, a specific frequency band is assigned for the operation of the specific system. In general, the frequency band is divided into a number of frequency channels, and each of the channels only occupies a fraction of the whole band. In a narrow-band communication system, the transmitter and receiver will select one channel for signal transmission. In a frequency-hopping spread spectrum (FHSS) communication system with adaptive frequency hopping (AFH), the system has to first determine the quality of each channel. The major impact to the channel quality is interference. The quality of a channel becomes bad if the frequency range thereof is overlapped with an interference source.

There are various types of interferences. Some typical interferences have bandwidths narrower than that of a channel. Others may have bandwidth that span from several to tens of the channels. Normally, the receiver only detects in a single channel each time, and switches from channel to channel to make a number of detections. Conventionally, the channel quality assessment for a channel is done by collecting the detections of this channel and is independent from the detections of other channels. As the number of channels becomes large, the total time for channel assessment for all channels becomes very long. Referring to Kwang-Cheng Chen, Hung-Kun Chen, and Chi-Chao Chao, *Selective Hopping for Hit Avoidance*, in IEEE P802.15 Working Group Contribution, IEEE 802.15-01/057r2, March 2001, a method for channel quality assessment is disclosed, wherein the channels are divided into three partitions and each partition is treated as a whole. This method proves much faster for channel assessment, but much of the frequency resolution is unfortunately lost.

SUMMARY OF THE INVENTION

Accordingly, there is a need for a channel quality assessment system having a short assessment time and concomitant good frequency resolution.

To achieve this, the present invention provides a channel quality assessment method and a system for performing the method used in a frequency hopping spread spectrum communication system. The communications system has a plurality of channels for receiving signal packet traffic utilizing a plurality of receiving signal slots based on a hop sequence. The method comprises the following steps. A plurality of channels are grouped into a plurality of groups, and each of said plurality of groups has a plurality of channels. Channel quality of each of said plurality of channels is determined from detection results of each of said plurality of groups.

The various objects and advantages of the present invention will be more readily understood from the following detailed description when read in conjunction with the appended drawings.

DETAILED DESCRIPTION OF THE INVENTION

Figure 1:
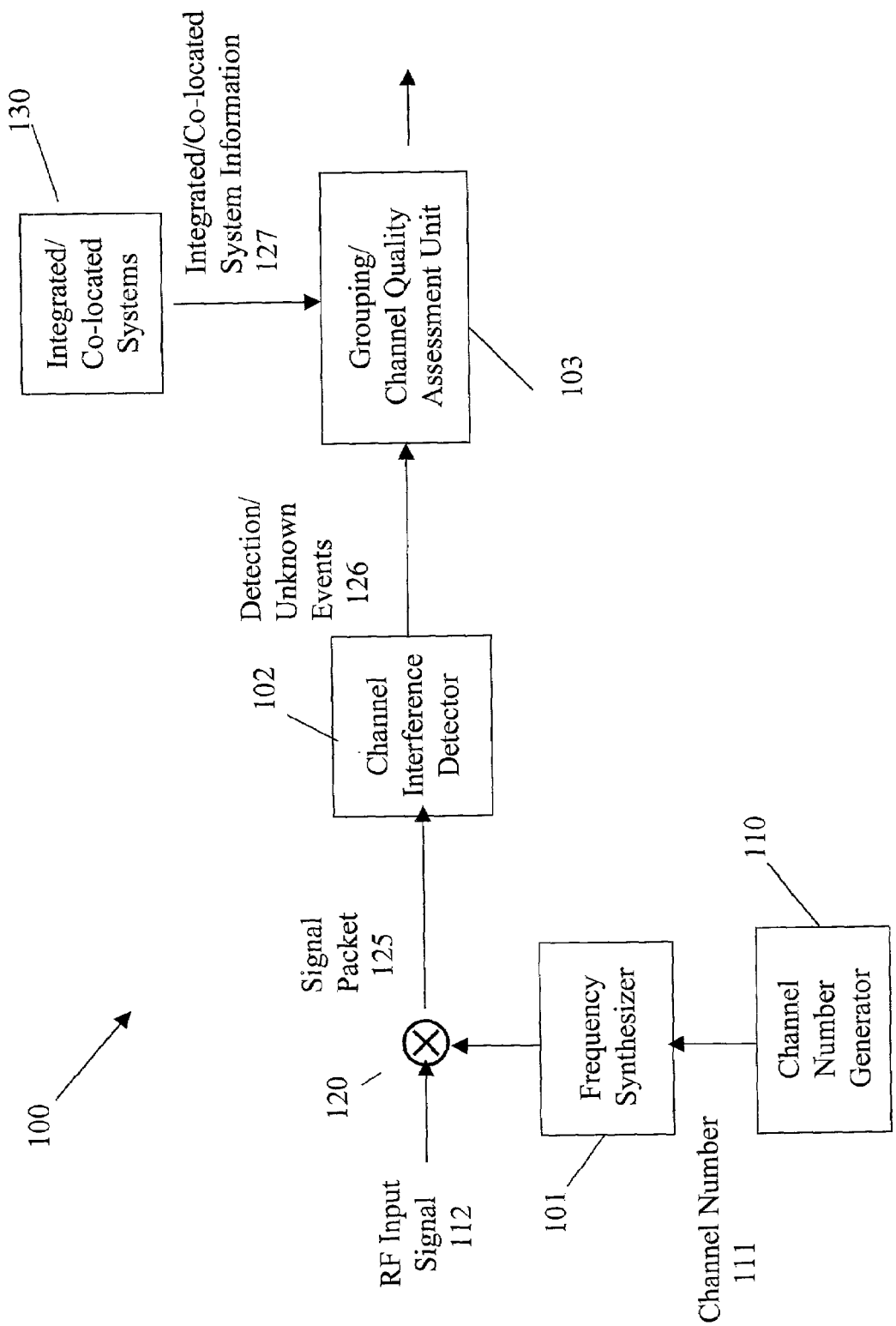
FIG. 1 shows a general system block diagram of the present invention.

FIG. 1 is a general system block diagram schematically illustrating the preferred embodiment of the present invention 100. A frequency synthesizer 101 provides a continuous sinusoidal frequency into mixer 120, the frequency being determined by a channel number 111 provided by a channel number generator 110 and inputted into mixer 120. The channel number 111 typically is derived from a hopping sequence generator in a FHSS system algorithm. In a narrow-band communication system without a hopping sequence, it comes from a sequence or an algorithm specifying the sequence of channels to detect. An RF input signal 112 is mixed at mixer 120 with the signal from the frequency synthesizer 101, the signal 112 in a desired channel being converted to a lower and fixed intermediate frequency (IF). Thus the frequency synthesizer 101 and mixer 120 together perform a channel selection function. A channel interference detector 102 performs channel interference detection and distinguishes among interference events, interference-free events and other unknown events generating detection/unknown even, 126. A grouping/channel quality assessment unit 103 groups some channels and which are collected as whole in order to determine the channel quality. In the preferred embodiment of the present invention, the channel quality is determined by an interference collision ratio, which is the ratio of the number of interference events to the sum of the number of interference events and interference-free events.

As the system is using the k-th channel, some channel interferences are made by the channel interference detector 102 whereby the detection gives an indication about an interference event or an interference-free event. Another possible outcome is an unknown event which occurs when channel interference detector 102 does not have sufficient confidence to make decision between an interference event and an interference-free event. Integrated and/or co-located systems 130 also may affect interference, so integrated/co-located system information signal 132 is also input to grouping/channel quality assessment unit 103 to produce a channel quality assessment 140.

Channel interference detector 102 utilizes two schemes for detecting interference, each of which is an embodiment of the present invention. The first embodiment checks the power level of a received signal packet 125. Received packets with lower power are more likely to have errors caused from noise, and these packets are indicated as unknown events. Packets with a power level exceeding a threshold are demodulated and checked for errors. The existence of error in a packet can be found by the error detection capability in the received signal packet 125. In the present invention, HEC (Header Error Check), CRC (Cyclic Redundancy Check) and FEC (Forward Error Correction code) are used for error detection. The signal packets 125 having errors are determined to be interference events, while signal packets 125 having no errors are determined to be interference-free events. Algorithmically, the channel interference detector 102 performs in this embodiment as follows:

Step 1: Determine that a signal packet is an unknown event if the received signal power of the signal packet is below a predetermined threshold.

Step 2: Determine that a signal packet is an interference event if the received signal power is above the predetermined threshold and an error is detected in any one of HEC, CRC, and FEC.

Step 3: Determine that a signal packet is an interference-free event if the received signal power is above the predetermined threshold and no error is detected in all of HEC, CRC, and FEC.

The second embodiment scheme utilizes the channel silent time between the channel active time. The channel silent time is the interval when there should be no transmission in the system and the signal strength in the channel silent time is measured. The channel interference detector 102 determines an interference event if the signal strength exceeds a predetermined threshold, otherwise it indicates an interference-free event. Algorithmically, the channel interference detector 102 performs in this embodiment as follows:

Step 1: Measure the received signal strength in the channel silent time.

Step 2: Determine that the received signal is an interference event if the received signal power is above a predetermined threshold.

Step 3: Determine that the received signal is an interference-free event if received signal power is below a threshold.

Grouping/channel quality assessment unit 103 performs channel quality assessment 140 utilizing several different embodiments according to the present invention. In one embodiment, the detection event 126 from channel interference detector 102 of one channel does not affect another channel. To obtain an interference collision ratio for each channel, the grouping/channel quality assessment unit 103 counts the numbers of interference events and interference-free events in detection/unknown event 126 for each channel in a given period of time while it discards other detection/unknown events such as unknown events. Grouping/channel quality assessment unit 103 then calculates the interference collision ratio for each channel as the ratio of the number of interference events to the sum of the number of interference events and the number of interference-free events.

A reliable determination by channel interference detector 102 requires seeing K detection events for each channel. If the number of channels is N, the total detection events for all channels are K*N, which becomes large with a large number of channels, N. This implies that the total time for channel quality assessment is long.

In the simple grouping embodiment of the present invention, the N channels are divided into P groups, and each group has an almost equal number of channels. Any event of a channel within a group is treated as an event of this group. To get an interference collision ratio for each group, the grouping/channel quality assessment unit 103 counts the number of interference events and interference-free events in detection/unknown event 126 for each group in a predetermined period of time while it discards other events such as unknown events. Grouping/channel quality assessment unit 103 then calculates the interference collision ratio for each group as the ratio of the number of interference events to the sum of the number of interference events and the number of interference-free events. Furthermore, an integrated/co-located system 130 provide an integrated/co-located system information 127 which includes some information about the system to help the grouping/co-located channel quality assessment unit to assess the quality more precisely.

For reliable determinations, K detection events from detection/unknown event 126 for each group need to be checked. Since the number of groups is P, the total detection events for all groups are K*P, which is much smaller than the case of no grouping, since P is usually much smaller than N. Thus amount of data necessary for the channel quality assessment can be reduced substantially. On the other hand, this will produce a poor frequency resolution; that is, perhaps some channels are good and some others are bad in a group, but this embodiment can not present such information.

Another embodiment of the present invention addresses interference having wide bandwidth utilizing a grouping of many channels to help to speed up the channel quality assessment. For the case of narrow-band interference an embodiment of the present invention utilizes grouping into one channel; i.e., no grouping. The preferred embodiment of the present invention achieves the desirable features of fast assessment and high frequency resolution. The preferred embodiment thus generalizes the grouping concept; that is, each group can have a different number of channels, while there can be overlapping between groups. Table 1 illustrates this idea.

TABLE 1

|  |  |  |  |  |  |  |  |  |
|---|---|---|---|---|---|---|---|---|
|  |  | 11 |  |  |  |  |  |  |
|  | 9 |  |  |  | 10 |  |  |  |
| Group number | 0 | 1 | 2 | 3 | 4 | 5 | 6 | 7 | 8 |
| Channel number | 0 | 1 | 2 | 3 | 4 | 5 | 6 | 7 | 8 |

In this embodiment, there are some groups (groups 0, 1, 2, 3, 4, 5, 6, 7, 8) containing exactly one channel, and other groups have more channels groups 9, 10, and 11). Some groups are overlapped with other groups, for example, group 11 is overlapped with group 9 and 10 in channels of 1, 2, 4, and 5. If K detection events are necessary for determining an effective interference collision ratio, then the time period for collecting K event in group 11 is generally only one fifth of that group 1. Therefore, the speed for determining channel quality is increased. However, since interference occurs statistically, therefore by this method, the interference is detected quickly and thus the communication system can quickly adjust the required schemes, such as determining a hop sequence, so as to achieve high communication quality. There are some types of groups that are more effective according to the following guidelines. Groups can contain one or more of the following (but they are not restricted to the following list): (a) only one channel in a group, (b) divide all the channels into groups having equal size, and (c) groups can be organized to match the frequency range of some types of known interference. The interference collision ratio calculation requires the collection of K detection events in a group. Thus for each group, two counters are needed. One is to count the number interference events of this group, while the other is to count the number of interference-free events of this group. Each time the sum of the two counters reaches K, the interference collision ratio is calculated by the ratio of the number of interference events to the sum of the number of interference events and the number of interference-free events. A storage element of the last interference collision ratio of this group is then updated to the calculated ratio. A last value of interference collision ratio is kept for each partition. If this ratio is higher than a predetermined threshold value, the group is an interfered group. If a group G is overlapped with another group that is an interfered group 1, and the size of group 1 is smaller than that of group G, then the overlapping channels in the group G are disabled; this is known as group channels disable. That is, the size of group G is reduced. As an example from Table 1, if the previous interference collision ratio value of group 1 is higher than the threshold, group 1 is marked as an interfered group. Then channel 1 in the group 9 and group 11 is disabled. The effective coverage of each group is shown in Table 2.

TABLE 2

| Group number | | Disable | 11 | | | | | | | |
|---|---|---|---|---|---|---|---|---|---|---|
| | 9 | Disable | 9 | | 10 | | | | | |
| | 0 | 1 | 2 | 3 | 4 | 5 | 6 | 7 | 8 | |
| Channel number | 0 | 1 | 2 | 3 | 4 | 5 | 6 | 7 | 8 | |

If a narrow-band interference is only in the range of channel 1, the interference collision ratio of group 9 may also exceed the threshold. The present invention remedies this if it is known that channel 1 is interfered from its last interference collision ratio, the overlapping channels from the groups with larger size being excluded. Each channel is given an interference collision ratio by the following technique. Since groups may overlap, a rule is needed to determine the interference collision ratio for a channel if it is contained in several different groups. The rule is as follows: The interference collision ratio of a channel is the interference collision ratio of the group that satisfies all of the following conditions: (a) the group contains this channel, and this channel is not disabled in the group, and (b) the group has the largest number of non-disabled channels.

In some cases, several communication systems, which can be interfering sources to each other, are built co-located or integrated 130. In these cases, information 132 related to the specific interfering system is passed directly to the interfered system according to the present invention. The procedure is to (1) get information from the co-located or integrated interfering system; this information includes one or more of the following: (a) the frequency channel, (b) the traffic load, (c) the received signal power. (2) From the information from step (1), obtain the channels overlapped with this interfering system, and obtain an interference collision ratio for these overlapped channels. (3) For these overlapped channels, select the larger of the inference collision ratios obtained in step (2) and that obtained by the method described above.

Figure 2:
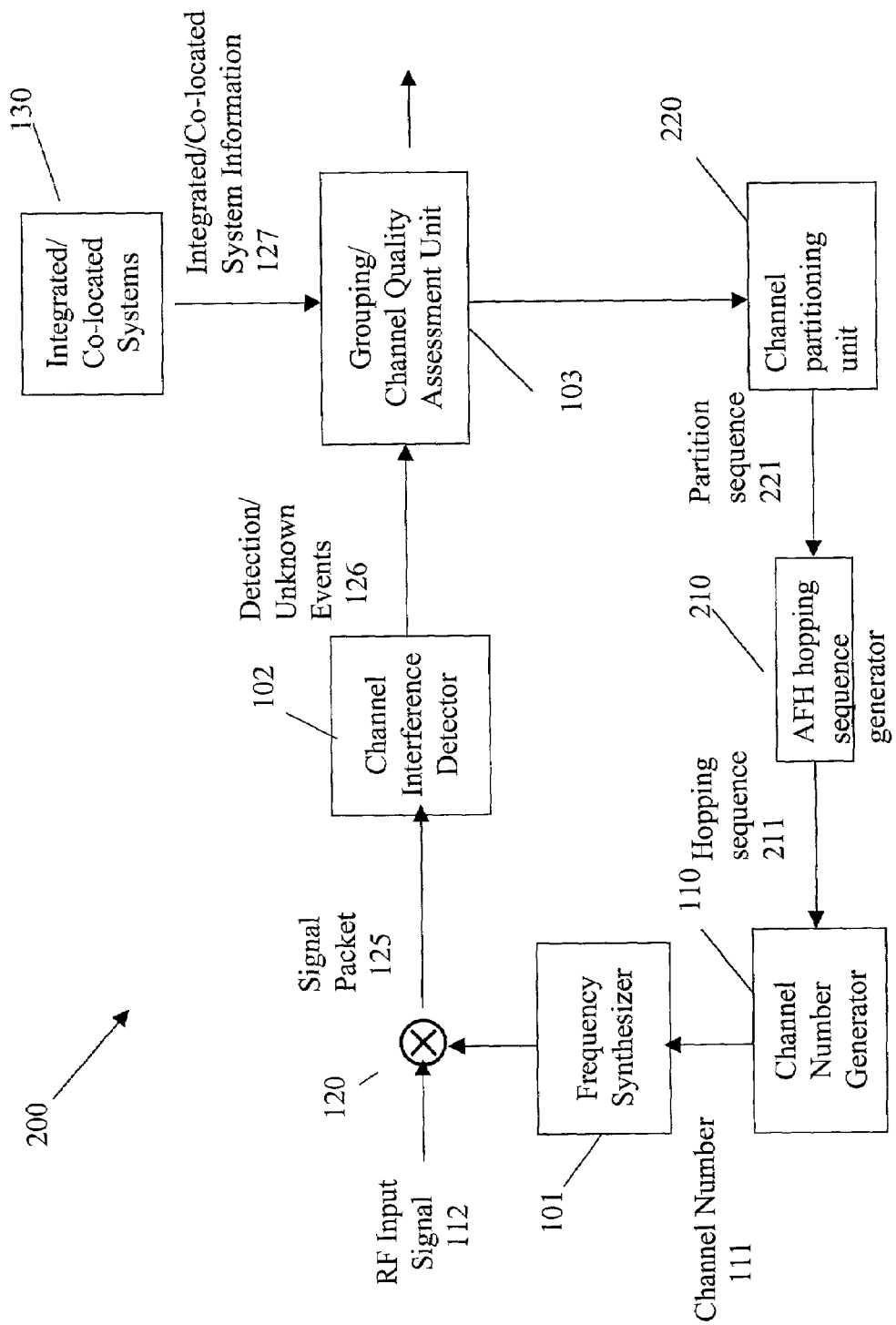
FIG. 2 shows a general system block diagram for one embodiment according to the present invention.

FIG. 2 is a schematic block diagram showing an embodiment of an adaptive frequency hopping (AFH) communication system wherein the channel partitioning block 220 serves to put channels having values of interference collision ratio within a predetermined range into the same one of partitions and outputs a partition sequence 221 into the AFH hopping sequence generator 210. One embodiment of the partitioning is to put channels into two partitions, good or bad. Another embodiment of the partitioning is to put channels into three partitions, good or bad or unused. AFH hopping sequence generator 210 has an input of partition sequence 221 from the channel partitioning block 220 and generates an adaptive frequency hopping sequence 211 which is then inputted to a channel number generator 110. The AFH hopping sequence generator 220 is to adaptively generate hopping sequence, based on the result of channel partitioning. The other blocks, such as channel number generator 110, frequency synthesizer 101, mixer 120, channel interference detector 102, grouping/channel quality assessment unit 103 and integrated/co-located systems 130, have functions identical to those disclosed in FIG. 1, and thus the details thereof will not be described here.

While the above is a full description of the specific embodiments, various modifications, alternative constructions and equivalents may be used. For example, the concepts described in the present invention are suitable for any communications system implementable in a frequency hopping spread spectrum system. Further, any implementation technique, either analog or digital, numerical or hardware processor, can be advantageously utilized. Therefore, the above description and illustrations should not be taken as limiting the scope of the present invention which is defined by the appended claims.

What is claimed is:

1. A channel quality assessment method for a communication system having a plurality of channels for receiving signal packet traffic utilizing a plurality of received signal, comprising the steps of:
   (a.1) grouping said plurality of channels into a plurality of groups, each of said plurality of groups having at least one channel; and
   (a.2) determining a channel quality of each of said plurality of channels responsive to detection results of the received signals in each of the plurality of groups; comprising steps of:
   (a.2.1) defining a quality assessing operator responsive to said plurality of receiving signals for determining qualifies of said plurality of channels and said plurality of groups containing said plurality of channels;
   (a.2.2) determining a quality assessing value of a first selective group from said quality assessing operator; wherein if a quality assessing value of said first selective group is not within a predetermined range, said first selective group is an unqualified group, if a second selective group is overlapped with said unqualified group, arid a size of said unqualified group is smaller than that of said selective group, then overlapping channels between said unqualified group and said second selective group are disabled in said second selective group, the size of said second selective group being reduced by the number of said overlapping channels;
   (a.2.3) determining a quality assessing value of a selective channel being the qualified assessing value of said first selective group that satisfies the follow conditions that
   (a.2.3.1) said selective group containing said selective channel, and said selective channel being not disabled in said selective group; and
   (a.2.3.2) said selective group has a largest number of non-disabled channels.

2. The method of claim 1, wherein after step (a.2.3.2) for an interfere source to the communication system, a quality assessing value of said selective channel is determined by the steps of:
  (b.1) determining a second quality assessing value of said selective channel by the steps of:
  (b.1.1) receiving information from the interference source;
  (b.1.2) obtaining channels responsive to said information received in step (b.1.1), in said communication system overlapped with the interfering source, and obtaining a quality assessing value for said overlapped channels; and
  (b.2) selecting for said overlapped channels, a larger one of said quality assessing value obtained from (a.2.3) and said second quality assessing value as said quality assessing value of said channel.

3. The method of claim 1, wherein said selective groups overlap.

4. The method of claim 1, wherein there is only one channel in a selective group.

5. The method of claim 1, wherein said plurality of channels are divided into groups having equal size of channels.

6. The method of claim 1, wherein groups are divided to match a frequency range of known interference.

7. The method of claim said step (a.2.1) further comprising a step of defining said quality assessing operator to be an interference collision ratio being the number of the measured interference divided by the number of selected received signal packets subtracting the number of unknown events, wherein an unknown event has a received signal power less than said first predetermined threshold.

8. The method of claim 7, comprising a step of determining interference in a received signal packet by an error detection method.

9. The method of claim 8, wherein said step of determining interference in a received signal packet further comprises a step of determining whether the received signal packet power is larger than a first predetermined threshold, whereby the received signal packet is designated as an unknown event if a received signal power of the received signal packet is less than said first predetermined threshold, and the received signal packet is designated as an interference event if received packet signal power thereof is larger than said first predetermined threshold, and the received signal packet has an error being detected responsive to said error detecting method, whereby the received signal packet is designated as an interference-free event if the received packet signal power is larger than said first predetermined threshold and the received signal packet has no error being detected responsive to said error detecting method.

10. The method of claim 9, said step further comprising the steps of:
  counting the number of interference events and the number of interference-free events for each of said plurality of groups; and
  as the sum of said interference events and said interference tee event of a third selective group being equal to a predetermined number, calculating an interference collision ratio for said third selective group as a ratio of the number of interference events to the sum of the number of interference events and the number of interference-free events.

11. The method of claim 1, wherein as a counting number of said plurality of received signals in a fourth selective group is equal to a second predetermined number, then the counting number is reset, and said quality assessing value of said fourth selective group is updated.

12. The method of claim 11, wherein a plurality of storage elements are utilized to store latest updated results of each group.

13. The method of claim 8, wherein said error detection method utilizes HEC.

14. The method of claim 8, wherein said error detection method utilizes CRC.

15. The method of claim 8, wherein said error detection method utilizes FEC.

16. The method of claim 8, wherein said error detection method utilizes a combination of HEC, CRC, and FEC.

17. The method of claim 1, said step (a.2.1) further comprising a step of defining said quality assessing operator to be an interference collision ratio being the number of the measured interference divided by the number of selected received signal packets.

18. The method of claim 17, wherein the step of determining interference in a received packet further comprises the steps of:
  (c.1) measuring a signal strength in a channel silent time, said channel silent time being a predetermined interval having no transmission signals; and
  (c.2) designating a received signal packet as an interference event if the signal power of the received signal packet in said channel silent time is larger than a second predetermined threshold; and designating the received packet of signals as an interference-free event if the signal power of the received packet of signals in said channel silent time is less than said second predetermined threshold.

19. The method of claim 18, further comprising the steps after step (c.2) of:
  counting the number of interference events and the number of interference-free events for each of said plurality of groups; and
  as the sum of said interference events and said interference -free event being equal to a predetermined number, calculating an interference collision ratio for said third selective group as a ratio of the number of interference events to the sum of the number of interference events and the number of interference-free events.

20. The method of claim 2, wherein said information in step (b.1) includes one selected from a group containing frequency channels of the interfere source, traffic loads of the interfere source and received signal powers of the interfere source and a predetermined combination thereof.

21. The method of claim 1, wherein said communication system is a frequency hopping spread spectrum system.

22. The method of claim 21, wherein said frequency-hopping spread spectrum system, includes an adaptive frequency hopping system.

23. A channel quality assessing device utilizable in a communication system having a plurality of channels for receiving signal packet traffic utilizing a plurality of receiving signal, comprising:
  channel grouping means for grouping said plurality of channels into a plurality of groups, each of said plurality of groups having a plurality of channels;
  channel quality determining means coupled to said channel grouping means for determining channel quality of each of said plurality of channels from detection results of each of said plurality of groups, further comprising:
    a quality assessing calculator responsive to said plurality of receiving signals for determining qualities of said plurality of channels and said plurality of groups containing said plurality of channels; whereby said quality assessing calculator determining a quality accessing value of a first selective group and output said quality assessing value;

first quality determining means for determining a quality assessing value of a selective channel being the qualified assessing value of said first selective group calculated from said quality assessing calculator; and second quality determining means, for an interfere source to the communication system, said second quality determining means determining a quality assessing value of said selective channel by determining a second quality assessing value of said selective channel using information from the interfere source; and a selector for overlapped channels, selecting a larger one of said quality assessing values obtained from said first quality determining means and said second quality assessing value from said second quality determining means as said quality assessing value of said channel.

24. A channel quality assessing device utilizable in a communication system having a plurality of channels for receiving signal packet traffic utilizing a plurality of receiving signal, comprising:

channel grouping means for grouping said plurality of channels into a plurality of groups, each of said plurality of groups having a plurality of channels;

channel quality determining means coupled to said channel grouping means for determining channel quality of each of said plurality of channels from detection results of each of said plurality of groups, further comprising:

a quality assessing calculator responsive to the plurality of receiving signals for determining qualities of said plurality of channels and said plurality of groups containing said plurality of channels; whereby said quality assessing calculator determining a quality accessing value of a first selective group an output said quality assessing value; and first quality determining means for determining a quality assessing value of a selective channel being the qualified assessing value of said first selective group calculated from said quality assessing calculator;

wherein said quality assessing value is an interference collision ratio being the number of channels having measured interference divided by the number of all received signal packets subtracting the number of unknown events, wherein an unknown event has a received signal power less than a first predetermined threshold.

25. A channel quality assessing device utilizable in a communication system having a plurality of channels for receiving signal packet traffic utilizing a plurality of receiving signal, comprising:

channel grouping means for grouping said plurality of channels into a plurality of groups, each of said plurality of groups having a plurality of channels;

channel quality determining means coupled to said channel grouping means for determining channel quality of each of said plurality of channels from detection results of each of said plurality of groups, further comprising:

a quality assessing calculator responsive to the plurality of receiving signals for determining qualities of said plurality of channels and said plurality of groups containing said plurality of channels; whereby said quality assessing calculator determining a quality accessing value of a first selective group and output said quality assessing value; and first quality determining means for determining a quality assessing value of a selective channel being the qualified assessing value of said first selective group calculated from said quality assessing calculator, wherein said quality assessing value is an interference collision ratio being the number of the measured interference divided by the number of selected received signal packets.

26. A channel quality assessing system utilizable in a communication system having a plurality of channels for receiving signal packet traffic utilizing a plurality of receiving signal, said system comprising: a channel number generator providing a channel number determining a frequency and then inputting a frequency signal;

a frequency synthesizer, coupled to said channel number generator for provi ding a continuous sinusoidal frequency signal;

a mixer having an input of an RF input signal and coupled to said frequency synthesizer, for mixing said RF input signal and said continuous sinusoidal frequency signal and thereafter outputting a signal packet;

a channel interference detector having an input from of said signal packet from said mixer for detecting interference in response to said the received signal packet; and a grouping/channel quality assessment unit, coupled to said channel interference detector, for grouping a predetermined number of channels from said plurality of channels and collecting said detecting interference for determining a channel quality.

27. The system of claim 26, wherein the grouping/channel quality assessment unit further comprises:

channel grouping means for grouping said plurality of channels into a plurality of groups, each of said plurality of groups having a plurality of channels, and quality assessing calculator coupled to said channel grouping means, for determining a quality assessing value and thus for determining the channel quality of each of said plurality of channels in response to a quality assessing value of each of said plurality of groups.

28. The system of claim 27, wherein said quality assessing value is an interference collision ratio being the number of channels having measured interference divided by the number of all received signal packets.

29. The system of claim 27, wherein said channel quality assessing system further comprises an integrated/co-located system for providing information of an interfere system.

30. The system of claim 27, further comprising a channel partitioning block having an input from said grouping channel quality assessment unit for classifying channels having values of quality assessing value within a predetermined range into the same one of a plurality of partitions;

an adaptive frequency hopping sequence generator for adaptively generating a hopping sequence based on a result of channel partitioning from the channel partitioning block and outputting said adaptive frequency hopping sequence to said channel number generator.

* * * * *